No. 676,676. Patented June 18, 1901.
F. G. DIETZ.
SUPPORTER FOR SHIRT WAISTS, SKIRTS, AND BELTS.
(Application filed Dec. 10, 1900.)
(No Model.) 3 Sheets—Sheet 1.

Witnesses Inventor

No. 676,676. Patented June 18, 1901.
F. G. DIETZ.
SUPPORTER FOR SHIRT WAISTS, SKIRTS, AND BELTS.
(Application filed Dec. 10, 1900.)
(No Model.) 3 Sheets—Sheet 2.
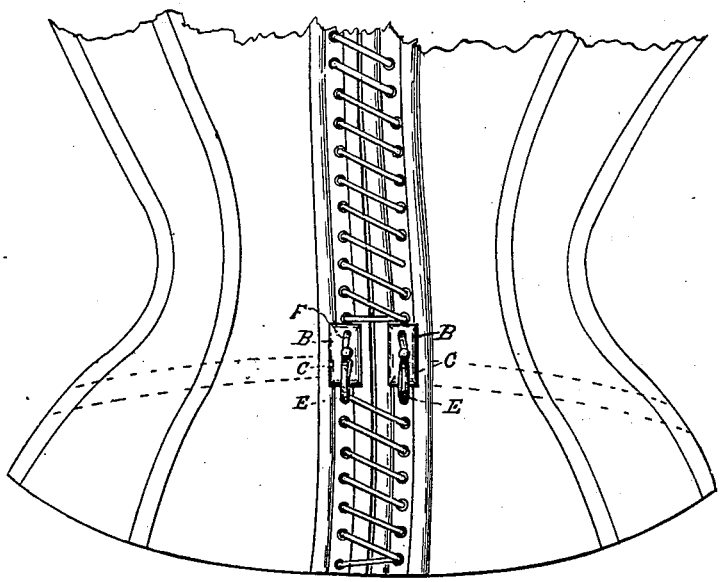
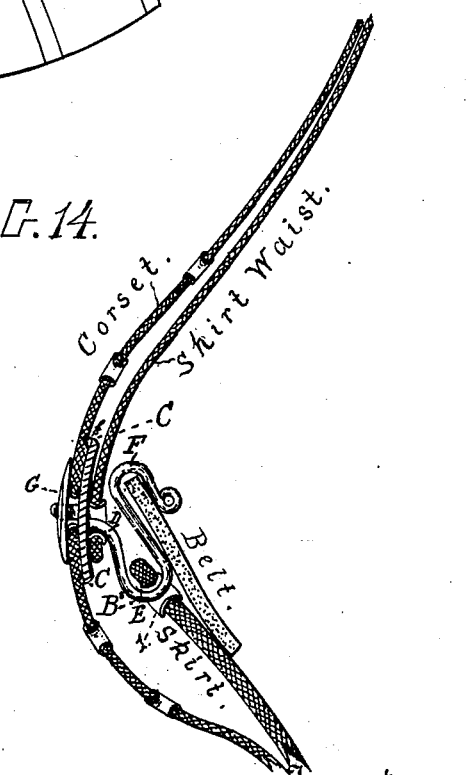

No. 676,676.  
F. G. DIETZ.  
SUPPORTER FOR SHIRT WAISTS, SKIRTS, AND BELTS.  
(Application filed Dec. 10, 1900.)
Patented June 18, 1901.
(No Model.)
3 Sheets—Sheet 3.
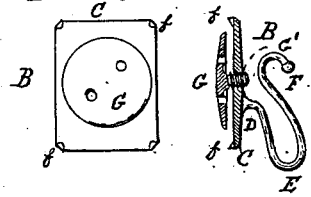
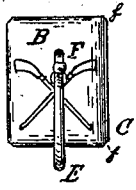
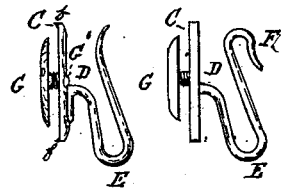
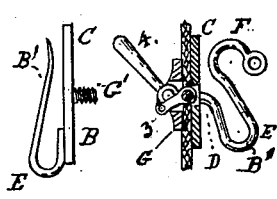
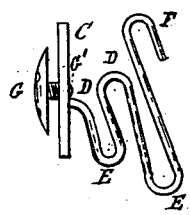
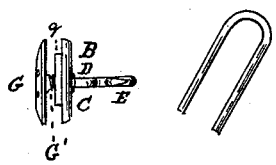
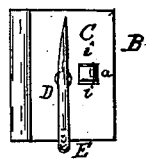
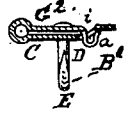
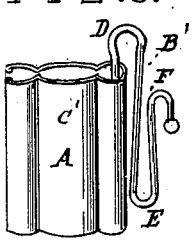
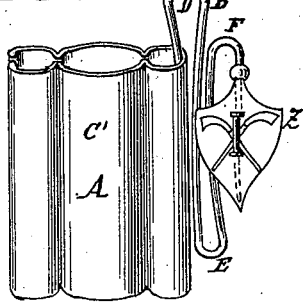
Witnesses  
David Mueller  
R. Boekley
Inventor  
Francis G. Dietz
THE NORRIS PETERS CO., PHOTO-LITHO., WASHINGTON, D. C.

UNITED STATES PATENT OFFICE.

FRANCIS G. DIETZ, OF NEW YORK, N. Y.

SUPPORTER FOR SHIRT-WAISTS, SKIRTS, AND BELTS.

SPECIFICATION forming part of Letters Patent No. 676,676, dated June 18, 1901.

Application filed December 10, 1900. Serial No. 39,422. (No model.)

*To all whom it may concern:*

Be it known that I, FRANCIS G. DIETZ, a citizen of the United States, and a resident of New York city, in the county of New York and State of New York, have invented certain new and useful Improvements in Supporters for Shirt-Waists, Skirts, and Belts, of which the following is a specification.

One feature of this invention relates to the employment of supporters on the rear portion of the wearer's corset rigidly clamped directly upon the same and a supporter attached at the central front part of the corset to lessen liability of the shirt-waist or skirt from shifting or becoming detached from the supporter by motions of the wearer's body.

A secondary feature of the invention relates to the novel construction of the supporters each with two opposite plates having a clamping device from one to the other to grip powerfully the corset portion between and providing on the outer plate a wire hook with several successive following loop-seats, of which an inner upward loop-seat close to the corset is adapted to receive, hold, and support the lower end of the shirt-waist and of which a secondary upward loop-seat is formed near the point and end of the hook to receive and hold the belt. Between said upward loop-seats is formed a downward loop-seat by which the top end of the skirt is received, suspended, and held. Both the shirt-waist and skirt are provided with large eyeleted holes sliding readily upon said hook, each to its relative loop-seat thereon provided for support. By these means in dressing the shirt-waist is first placed to its loop-seat, then skirt, and finally the belt. In undressing the order of removing said parts from the supporter is reversed. Both dressing and undressing are done very rapidly and conveniently. I prefer to secure the supporter to the corset instead of to a belt by reason of the fact that a belt is more liable to shift or turn from its place than a corset.

Figure 1:
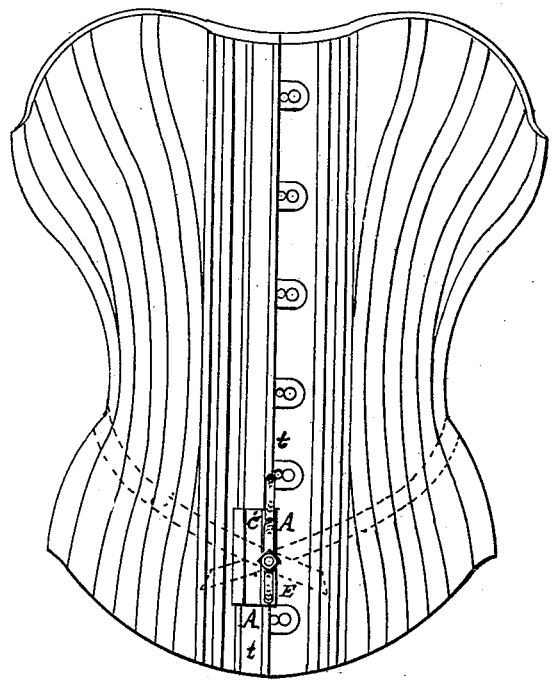
Figure 16:
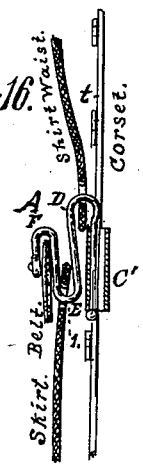
Figure 18:
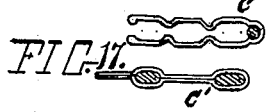
Figure 17:

In the annexed drawings, Figure 1 represents a front view of a ladies' corset. To the front which opens and to one of its sides is attached one of my improved front supporters, as shown. Fig. 2 is a rear view of the corset, showing centrally attached a pair of my improved rear supporters. Fig. 3 is a perspective view of the front supporter detached. Fig. 4 is a face view of one of my rear supporters detached. Fig. 5 is a rear view of the same. Fig. 6 is a sectional side elevation of the same. Fig. 7 is a side elevation of a modification of the same when formed without a belt-holder. Fig. 8 is a modification of the same and having a threaded shank on the supporter back plate to operate with a screw-nut over it for clamping the corset. Fig. 9 represents a modification of the supporter substituting the screw-shank and nut by a lever and crank for clamping the corset. Fig. 10 represents a fork or socket-wrench for operating the clamping-screw of the supporter. Fig. 11 represents a face view of the same supporter, its construction for securing the same to the corset being modified by inserting a folded base-plate between which the corset is clenched and the loose end of one leaf engaging the other through an aperture. Fig. 12 is a sectional edge view of the same. Fig. 13 is a top view of the supporter, showing its clamping-plate when required with a vertical guide offset $q$ to prevent its turning from a vertical position with corsets having a vertical groove. Fig. 14 is a sectional side elevation of the rear supporter to a larger scale applied and secured on the rear part of the corset, showing the lower part of the shirt-waist and upper part of the skirt passed and attached over the supporter snd the belt also placed and held by the supporter. Fig. 15 is a detached perspective view, on a somewhat larger scale, of the front supporter with a modification of a shield placed over its point to protect the wearer against its point causing harm. Fig. 16 is a sectional side view of the front supporter shown in position attached to the corset, showing the lower end of the shirt-waist attached to the inner loop-seat and the top band of the skirt over the middle loop-seat and the belt placed and held secured under the outer loop-seat of said supporter, all in proper position, and that they may be quickly and conveniently attached and fastened or taken off and removed. Fig. 17 represents a horizontal cross-section of the forward corset end, with its bars, upon which the supporter is secured and clenched. Fig. 18 represents a like portion of the clampingsection of the front supporter, which is secured over the aforesaid portion of the corset and its bars. Fig. 19 represents a side elevation of the rear supporter, with a modification providing one loop-seat more in case of requiring an additional garment to secure with the supporter. Fig. 20 represents a modification of the rear supporter, which is provided with a sharp-pointed end to pass through the waist and skirt when not provided with eyelets or holes to pass through.

The letter A of reference indicates the front supporter, which is attached centrally on the front side of the corset, as shown in Figs. 1, 3, 15, and 16.

The letters B B of reference indicate two rear supporters attached to the rear side of the corset and are arranged equidistant from each side of the waist-line, as shown. Each supporter B has a flat plate C, held upon the outside over the corset-bars, and a secondary plate G over the inside of said bars, and said plate C has a threaded shank G′ passing through one of the holes in the corset-bar and engaging a threaded opening in the plate G, provided to draw said plates C and G together and powerfully clamping the corset and its bars between, thereby rigidly securing the supporter to the corset. On the outside of the plate C of each supporter B is formed or permanently secured a suitably strong wire assembling-hook B′, forming, with the face of the plate C, an upward loop-seat D, and said wire hook from the loop-seat D projects downward a short distance and is bent with a downward loop-seat E, from which the wire is bent to pass upward and form a secondary upward loop-seat F a little above the loop-seat D. Each plate C is provided at each corner with a tooth $f$, which sinks into the corset fabric to prevent the turning of said plate C.

The lower part of the shirt-waist and upper part of the skirt has for each supporter B B a large eyeleted hole 1, as shown in Figs. 14 and 16, for the shirt-waist and skirt to readily pass over the assembling-hooks.

In dressing the shirt-waist is first passed over the assembling-hook and is lodged in the loop-seat D. After this the skirt is passed over the assembling-hook B′ and lodged in the loop-seat E. Thereafter the belt is placed into the loop-seat F.

The front supporter A is in Figs. 1 and 16 attached to the flap $t$, covering the junction of the corset, and the supporter A is provided with a vertical corrugated case C′, made of spring metal and covering the outer vertical edge and the sides of the corset portion and clenching the same by the spring-power sufficiently to prevent the supporter from detaching from the corset. The leaves of the case C′ are pressed inward over the corset-bars to grip them powerfully. To the case C′, within the space of its closed edge or loop, is provided and firmly attached a like assembling-hook B′, of wire, as with the supporter B, having a similar upward loop-seat D to receive and hold the lower part of the shirt-waist, a downward loop-seat E to receive and hold the upper part of the skirt, and a secondary upward loop-seat F to receive and hold the belt. By these means the shirt-waist and skirt are readily attached to or detached from the supporter A. I prefer clamping the corset by the screw G′, having a large head, as shown in Figs. 5, 6, 7, 13, 19, and 20, which has two holes for turning by means of the socket-wrench shown in Fig. 10. The screw G′ may be modified and may have a threaded opening engaging a threaded shank on the supporter B, as shown in Fig. 8, or the clamping device may be modified by connecting the back of the plate C of the supporter B with the plate G by a crank 3 and pivot-lever 4, as shown in Fig. 9, to answer the same clamping of the corset between said plates. It may also be modified by constructing the plates C and G of one plate folded to be opposite one another, as shown in Figs. 11 and 12, and made of sheet spring metal and having the part C provided with the assembling-hook B′, as with the supporter B, and having a central square opening $i$, as shown in Figs. 11 and 12, and the secondary portion $G^2$ of the plate or substitute for the plate G being folded over the back of the part C and being formed with a spring-lip $a$ opposite the opening $i$, which will contract by being forced through said opening and allowed to expand over the part C, thereby locking the plates together by proper pressure, and thus clenching the corset. This construction of the supporter is well adapted for securing the supporter upon corsets of textile fabric. Z is a shield placed upon the point of the loop-seat F, serving as an ornament and preventing injury to the user.

From the foregoing it will be observed that by my construction of the supporter and its devices for securing and holding the same and placing each garment to a separate seat on the same supporter and no garment placed in the same seat with another each garment is readily detected by hand in dressing and undressing when done rapidly and conveniently.

What I desire to secure by Letters Patent is—

1. A supporter for shirt-waists, skirts and belts, comprising a clamping device having a supporter provided with an inner upwardly-extending loop adapted to support and lodge a shirt-waist, a downwardly-extending loop to support and lodge a skirt, said support terminating in an upwardly-extending loop supporting a waist-belt, substantially as specified.

2. A supporter for shirt-waists, skirts and belts, comprising a clamping device having a supporter provided with an inner upwardly-extending loop adapted to support and lodge a shirt-waist, a downwardly-extending loop to support and lodge a skirt, said support terminating in an upwardly-extending loop supporting a waist-belt, and said shirt-waist and skirt having eyelets through which said supporter is passed, substantially as specified.

3. A supporter for shirt-waists, skirts and belts, comprising a double-plate clamping device, clamping between the plates a corset, and a supporter, said supporter having an upwardly-extending loop or seat to lodge the shirt-waist and prevent it from moving upward, and having a following part formed with a downwardly-extending loop or seat to lodge a skirt and prevent it from dropping, said following part terminating in a secondary upwardly-extending loop or seat, for lodging a belt, said shirt-waist and skirt having openings provided with eyelets, through which said supporter passes, substantially as set forth.

Signed at New York, in the county of New York and State of New York, this 7th day of December, A. D. 1900.

FRANCIS G. DIETZ.

Witnesses:
DAVID MUELLER,
R. BOEKLEN.